United States Patent
Shelor

(10) Patent No.: US 6,844,767 B2
(45) Date of Patent: Jan. 18, 2005

(54) HIERARCHICAL CLOCK GATING CIRCUIT AND METHOD

(75) Inventor: Charles F. Shelor, Arlington, TX (US)

(73) Assignee: VIA-Cyrix, Inc., Fremont, CA (US)

( * ) Notice: Subject to any disclaimer, the term of this patent is extended or adjusted under 35 U.S.C. 154(b) by 0 days.

(21) Appl. No.: 10/463,586

(22) Filed: Jun. 18, 2003

(65) Prior Publication Data

US 2004/0257139 A1 Dec. 23, 2004

(51) Int. Cl.[7] .................................................. G06F 1/04
(52) U.S. Cl. ...................................... 327/291; 327/295
(58) Field of Search ................................. 327/291, 293, 327/295, 297; 326/93; 713/500–503

(56) References Cited

U.S. PATENT DOCUMENTS 5,815,725 A * 9/1998 Feierbach .................... 713/322
6,583,648 B1 * 6/2003 Cai ............................. 326/93
6,611,920 B1 * 8/2003 Fletcher et al. ............. 713/322

* cited by examiner

Primary Examiner—Kenneth B. Wells
(74) Attorney, Agent, or Firm—Winston Hsu

(57) ABSTRACT

A power saving hierarchical clock gating circuit includes a first level clock gate, a plurality of second level clock gates connected to the first level clock gate, and a plurality of third level clock gates for selectively providing a clock signal to a functional block. Each third level clock gate is connected between a second level clock gate and a register, or other low level device, of the functional block for selectively providing the clock signal to the register. Accordingly, the clock signal is conveyed from the first level clock gate through a second level and a third level clock gate to a register when the corresponding first, second, and third level clock gates are activated by associated decision logic.

3 Claims, 5 Drawing Sheets

HIERARCHICAL CLOCK GATING CIRCUIT AND METHOD

BACKGROUND OF INVENTION

1. Field of the Invention

The present invention relates to power management in integrated circuits, and more specifically, to clock gating of circuits.

2. Description of the Prior Art

Clock gating is used to reduce power consumption in integrated circuits. Typical clock gating provides a clock signal to functional blocks that are active for one or more clock cycles, and withholds the clock signal when blocks are inactive. When a block is inactive, that is, when its output is not required or is ignored, a clock gate prevents the block from receiving the clock signal. The inactive block does not perform any unnecessary operations, and power is saved.

Generally, neglecting short-circuit power and leakage current, power consumption, $P_C$, in a CMOS circuit C comprising gates g can be expressed as:

$$P_C = \frac{1}{2} \cdot f \cdot Vdd^2 \sum_{g \in C} (A_R \cdot C_L^g) \quad \text{(Eqn.1)}$$

where, f is clock frequency;

Vdd is the circuit power supply voltage;

$A_g$ is a gate activity factor, and $C_L^g$ is gate load capacitance.

The aim of clock gating is to reduce circuit activity, A, and by this, reduce the total power consumption, $P_C$ according to Eqn.1. Specifically, if sections of the circuit are not required, the activity of these sections should be reduced or eliminated when possible.

FIG. 1 shows an exemplary prior art clock gate 10 controlling clock signal distribution to a logic circuit 16. The clock gate 10 includes a d-latch 12 and an AND gate 14. The logic circuit 16 outputs an enable signal to the data input of the d-latch 12, which, in conjunction with the AND gate 14, determines if the logic circuit 16 receives the clock signal. When the logic circuit 16 is operational, the enable signal is a logical '0' and the clock gate 10 conveys the clock signal to the logic circuit 16. Similarly, when the logic circuit 16 is not processing data or otherwise not intended to be operational, it outputs a logical '1' to the clock gate 10, which accordingly withholds the clock signal. Providing the enable signal has an adequate source, the implementation of the clock gate 10 can save a significant amount of power in the logic circuit 16 to justify the increased amount of components. While clock gate 10 is well known by those skilled in the art, Long et al. provide an improved design in U.S. Pat. No. 6,232,820, which is incorporated herein by reference.

Conventionally, clock gating has been implemented for major functional blocks of a circuit. Referring to FIG. 2, major functional blocks 20 are supplied a clock signal through clock gates 24. Operations of each functional block 20 are realized by pluralities of registers 22 (data inputs and outputs omitted from FIG. 2 for clarity). The clock gates 24 are provided with an enable signal to activate or deactivate the corresponding functional blocks 20. Typically, buffers 26 are also provided to match clock delays where necessary.

During operation, each functional block 20 outputs an enable signal to the corresponding clock gate 24, which accordingly provides or withholds the clock signal. While this functional block level clock gating scheme has advantages, one key disadvantage is coarseness. Specifically, if a single register is required to operate, an entire functional block must be supplied with the clock signal, and thus power may be wasted through unnecessary operations.

Another example of prior art clock gating is illustrated in FIG. 3. A clock signal is selectively provided to individual registers 32 of functional blocks 30 through clock gates 34 and buffers 36. Each register may then be provided with the clock signal as required. A similar structure is disclosed by Minami et al. in U.S. Pat. No. 6,272,667 (FIG. 22), which is incorporated herein by reference. Overall power savings are significantly reduced by power required for the numerous clock gates 34 themselves, however, pinpointing registers that require the clock signal and then precisely providing the clock signal is possible. Implemented at the lowest level of functional block design, clock gating can be performed with fine control al the cost of reduced efficiency.

In the prior art, optimum power savings are not achieved because control of clock distribution is too coarse, being performed at the functional block level and allowing much circuitry to operate unnecessarily; or too fine, being performed at the individual register level wasting power through superfluous clock gates.

SUMMARY OF INVENTION

It is therefore a primary objective of the claimed invention to provide a hierarchical clock gating circuit and related method of clock gating to allow for optimum control of clock distribution solving the above-mentioned problems.

Briefly summarized, the claimed invention includes a first level clock gate for selectively providing a clock signal, a plurality of second level clock gates connected to the first level clock gate for selectively providing the clock signal, and a plurality of third level clock gates, each third level clock gate connected between a second level clock gate and a subsection of the functional block for selectively providing the clock signal to the subsection of the functional block. Accordingly, the clock signal is conveyed from the first level clock gate through a second level and a third level clock gate to a subsection of the functional block, when the corresponding first, second, and third level clock gates are activated.

According to the claimed invention, an enable decision logic circuit can be connected to the subsections of the functional block for receiving output of the subsections and determining if the subsections require the clock signal, the enable decision logic circuit outputting corresponding enable signals to the clock gates.

It is an advantage of the claimed invention that the first, second, and third level clock gates offer optimum control of clock distribution to the functional block thereby optimizing power consumption of the functional block and its parent circuit.

It is a further advantage of the claimed invention that a second level clock gate can replace a hold value circuit, such as a multiplexer, in certain applications.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
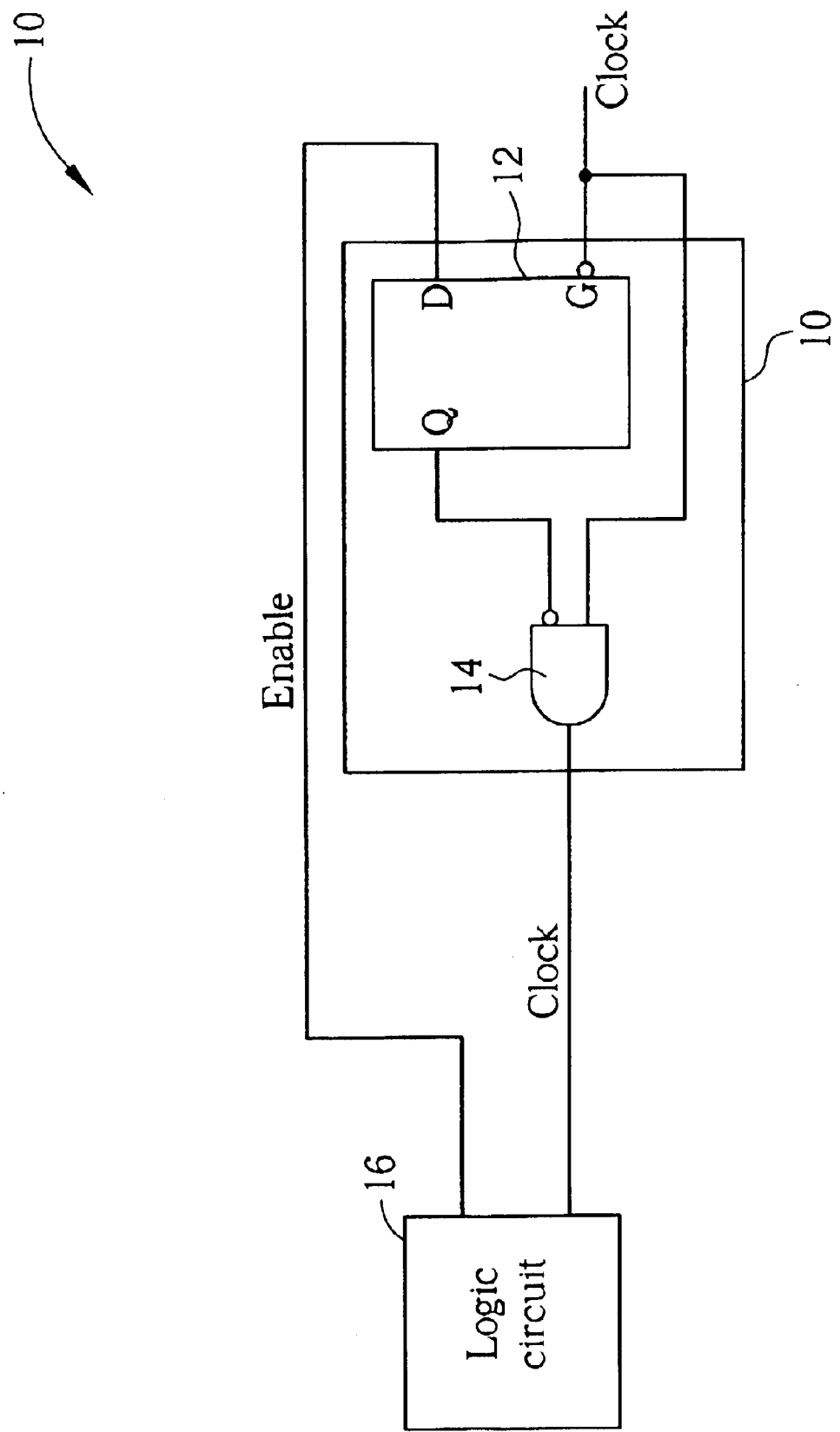
FIG. 1 is a block diagram of a clock gate circuit according to the prior art.
Figure 2:
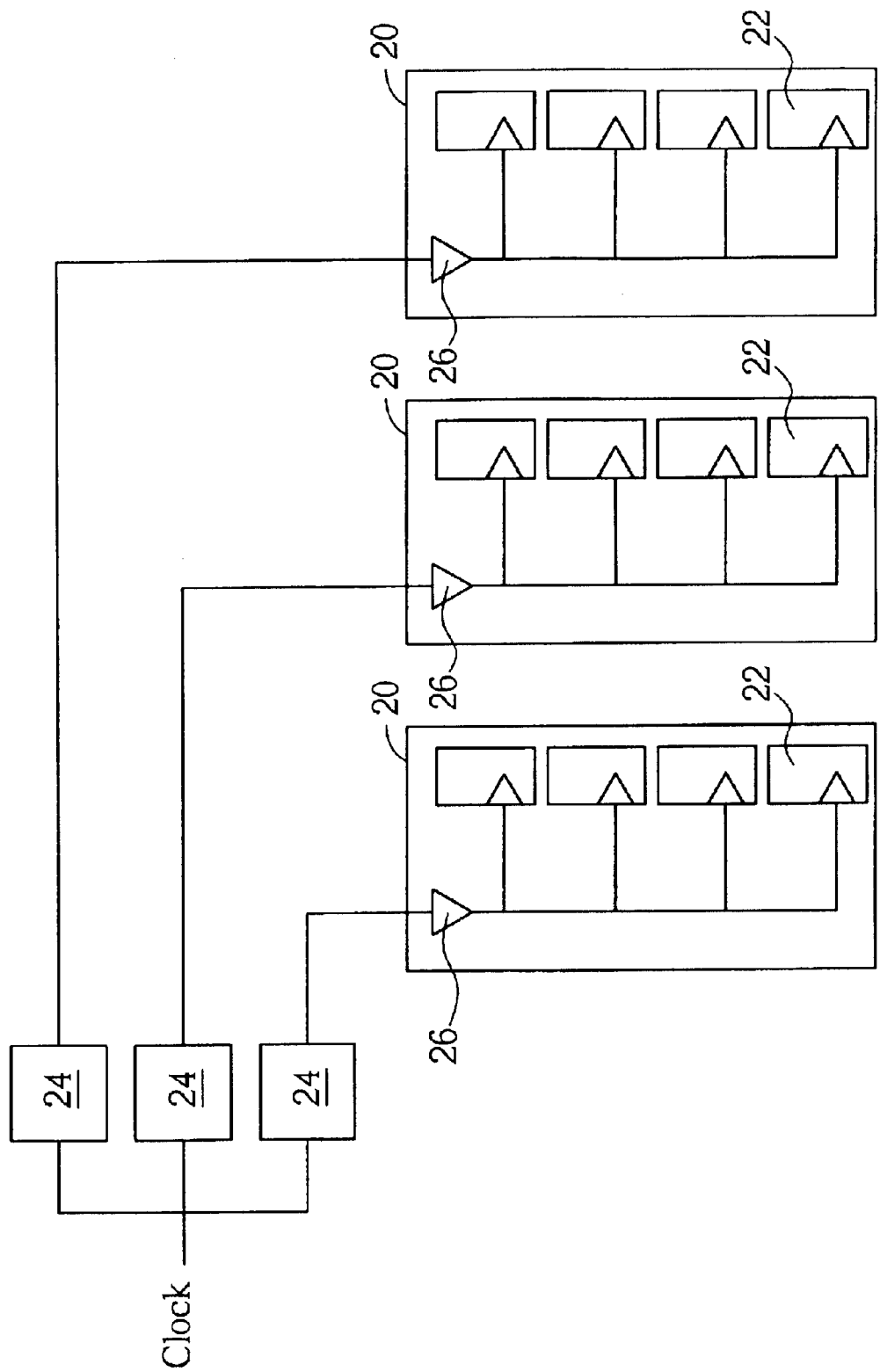
FIG. 2 is a block diagram of clock gating functional blocks according to the prior art.
Figure 4:
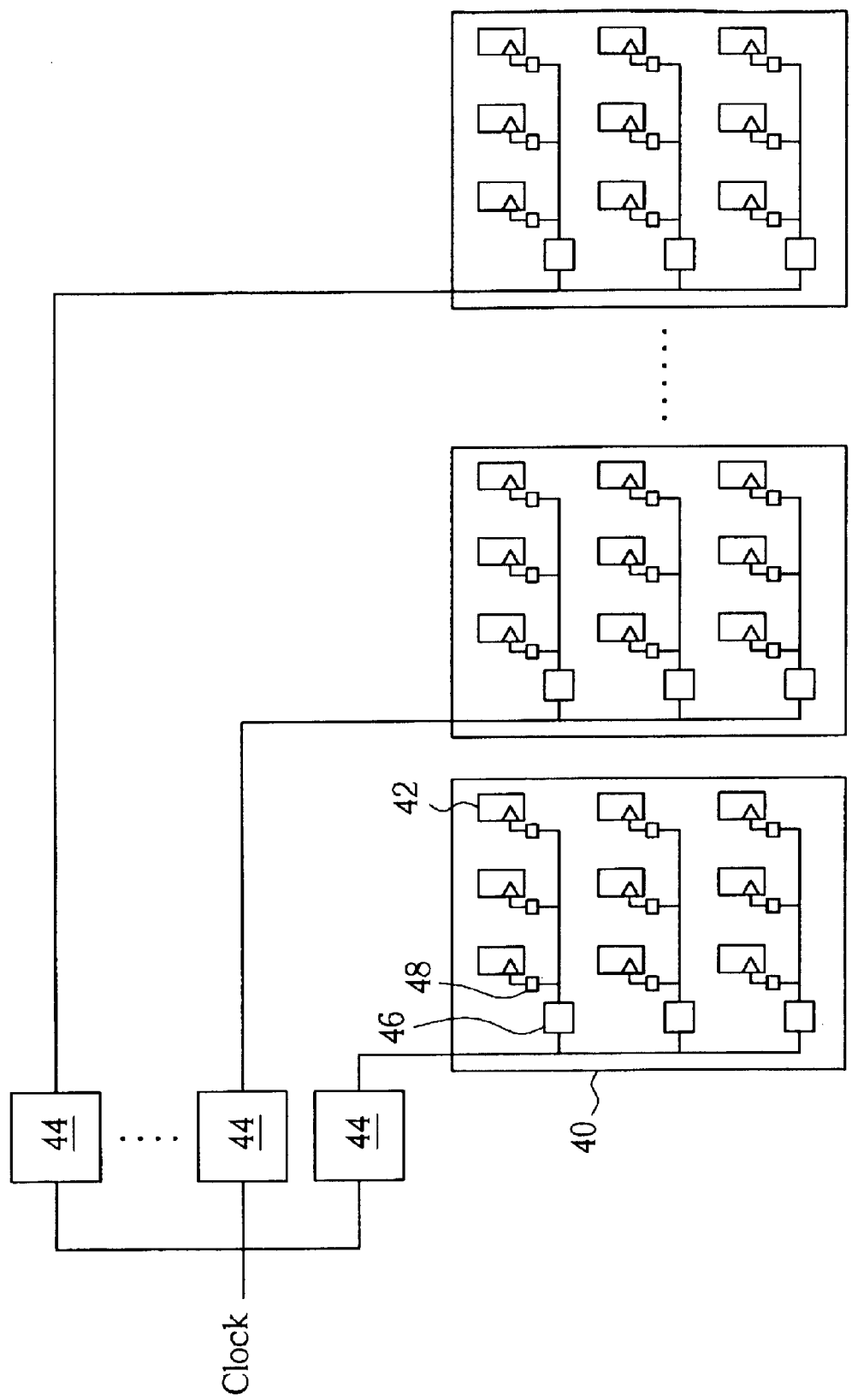
FIG. 4 is a block diagram of hierarchical clock gating according to the preferred embodiment of the present invention.

Referring to FIG. 4, a hierarchical clock gating circuit according to the preferred embodiment of the present invention is illustrated. The components shown in FIG. 4 are formed as an integrated circuit by well-known processes. Three clock gating levels comprising first level clock gates 44, second level clock gates 46, and third level clock gates 48 are established to control clock signal distribution to functional blocks 40. All clock gates 44, 46, and 48 are of well-known design such as that shown in FIG. 1. Each functional block 40 is made up of a plurality registers 42 (inputs and outputs omitted from FIG. 4 for clarity) serving a common function such as a coprocessor or arithmetic logic unit. The registers 42 can be used as memory cells, data registers, or other typical low level devices. Each register 42 is supplied the clock signal through a corresponding third level clock gate 48. Sections of registers 42, which can be selected following sound design principles, and the corresponding third level clock gates 48 (In FIG. 4 such a section is shown having three elements, however, more or fewer are possible.) are supplied the clock signal by a second level clock gate 46. All second level clock gates 46 in one functional block 40 are supplied the clock signal by a corresponding first level clock gate 44. As a result, individual registers 42 may selectively be supplied the clock signal individually through the third level clock gates 48, in sections through the second level clock gates 46, and on the scale of the functional device 40 through the first level clock gates 44.

In operation, when a particular register 42 is required to be active and receive the clock signal, the corresponding third level clock gate 48, second level clock gate 46, and first level clock gate 44 must be enabled. Generally, the clock signal can be withheld from registers having output that is not required or will not change if power savings can be achieved. Enable signals generated by decision logic located in the functional blocks 40 are used to control the clock gates 44, 46, 48 to provide the clock signal as required. For example, when an entire section of registers 42 does not require the clock signal the corresponding second level clock gate 46 can be controlled to withhold the clock signal from that section of registers, thereby saving power that would unnecessarily be consumed by the section of registers and the corresponding third level clock gates.

Figure 5:
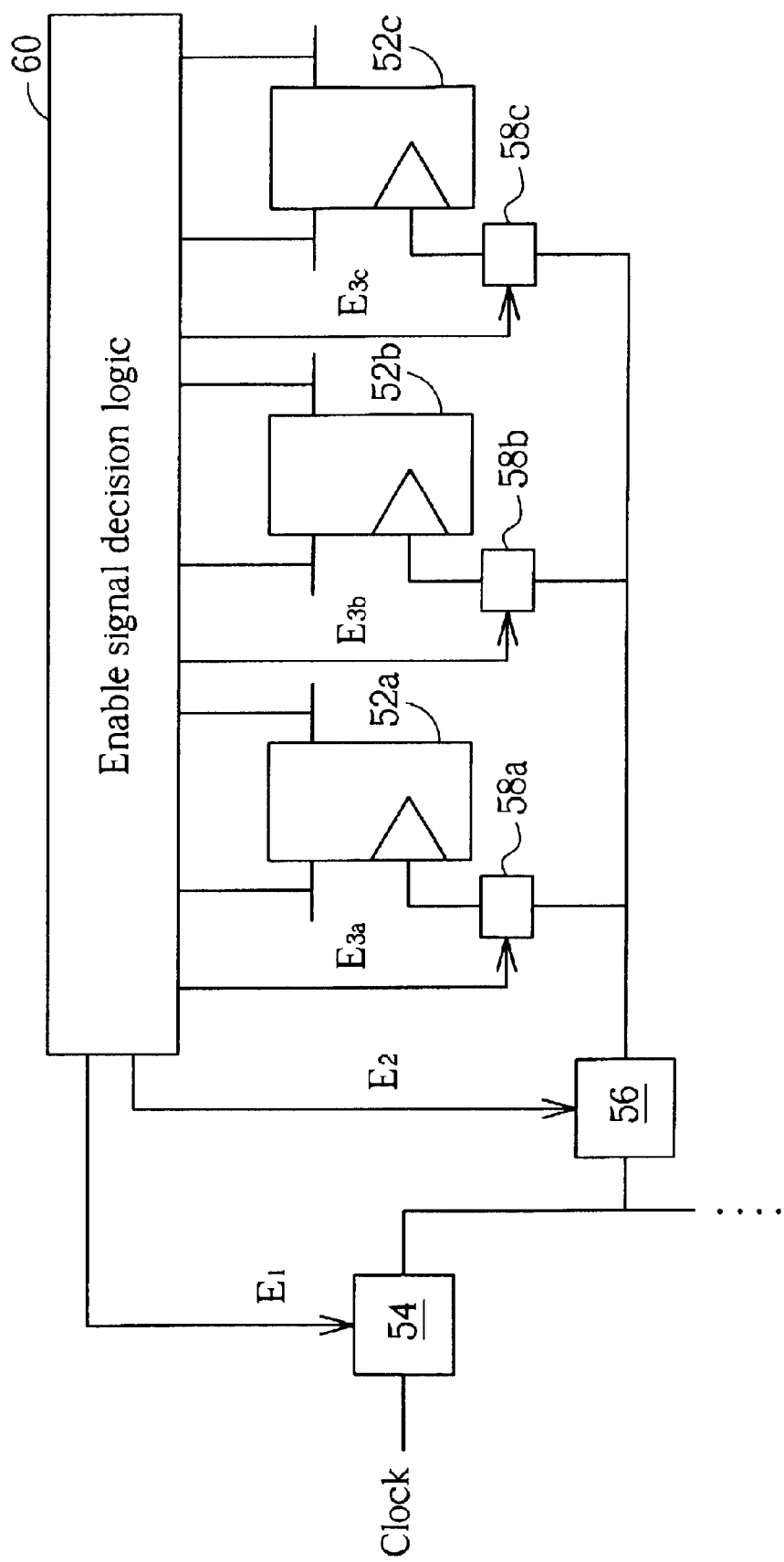
FIG. 5 is a block diagram of a section of a functional block according to the present invention.

FIG. 5 illustrates a section of a functional block under hierarchical clock gating according to the present invention, and specifically, shows decision logic and enable signal paths for controlling the hierarchical clock gating. A first level clock gate 54 provides a clock signal to a second level clock gate 56, which in turn provides the clock signal to third level clock gates 58a, 58b, 58c. The third level clock gates 58a, 58b, 58c provide the clock signal to corresponding registers 52a, 52b, 52c respectively. In FIG. 5, the first, second, and third level clock gates and the overall structure of the functional block is similar to that of FIG. 4, with only one section of the functional block being illustrated for clarity. Further provided is an enable signal decision logic 60 for outputting enable signals to the hierarchy of clock gates.

The decision logic 60 outputs an enable signal E1 to the first level clock gate 54, an enable signal E2 to the second level clock gate 56, and enable signals E3a, E3b, E3c to the third level clock gates 58a, 58b, 58 respectively. The decision logic 60 accepts input from the registers 52a, 52b, 52c. Data inputs and outputs of the registers 52a, 52b, 52c are also naturally connected (connections not shown in FIG. 5) to other devices inside and outside of the functional block. In an example of a most basic form of the decision logic 60, OR gates are used to logically OR the third level enable signals E3a, E3b, E3c to generate the second level enable signal E2, and likewise, second enable signals E2 are logically ORed to generate the first level enable signal E1. Thus, if any register requires the clock signal, the enable logic 60 can efficiently control all three levels of clock gating to supply the clock signal. No matter the specific structure, the decision logic 60 allows for the registers 52a, 52b, 52c to be activated and deactivated according to the clock gates controlled by the respective enable signals, which are based on feedback from the registers 52a, 52b, 52c.

Practical applications of the present invention include gating an external memory reference clock when processor accesses are being completed by memory caches without requiring external memory, and clock gating to implement stall conditions within a processor pipeline that result from resource conflicts and memory wait requests.

Figure 3:
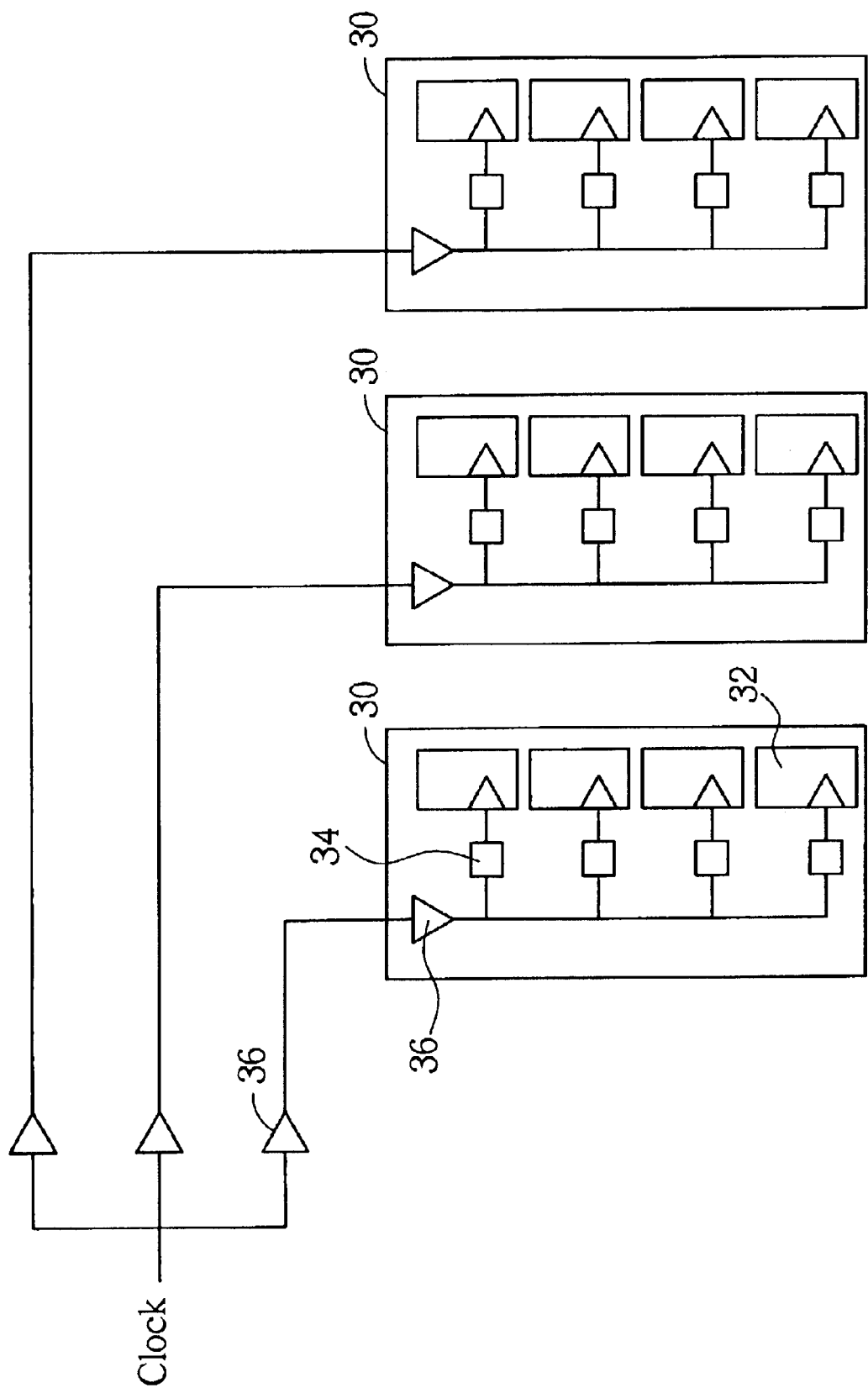
FIG. 3 is a block diagram of clock gating individual registers according to the prior art.

Power savings are realized with the present invention as a clock signal can be withheld from registers and low-level clock gates not requiring it. In addition, power to the decision logic is reduced as it operates on the second or third level of clock gates. Moreover, hardware can be reduced as hold value circuits can be eliminated in many data paths, a typical hold value circuit being a multiplexer capable of reloading a registers value when a hold condition (i.e. a wait state or stall) is required. Elimination of such multiplexers from data paths further reduces power consumption. Furthermore, comparing the present invention hierarchical clock gating structure shown in FIG. 4 to the prior art clock gating structure of FIG. 3, buffer hardware is saved when replaced by a clock gate.

In contrast to the prior art, the present invention hierarchical first, second, and third level clock gates offer improved control of clock distribution to the functional block and thus optimize power consumption of the functional block and the associated clock distribution decision logic. The present invention can realize improved power savings over the prior art.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for gating a clock signal for distributing the clock signal to subsections of a functional block, the method comprising:

providing a first level clock gate, a plurality of second level clock gates connected to the first level clock gate, and a plurality of third level clock gates, each third level clock gate connected between a second level clock gate and a subsection of the functional block;

receiving feedback enable signals from the subsections of the functional block to determine if the subsections require the clock signal;

activating the first level clock gate when any subsection of the functional block requires the clock signal;

activating a second level clock gate when any section of the functional block connected to the second level clock gate requires the clock signal; and activating a third level clock gate when any connected subsection of the functional block requires the clock signal.

2. The method of claim 1 wherein each subsection of the functional block is a register.

3. An integrated circuit comprising a plurality of functional blocks and a corresponding plurality of hierarchical clock gating circuits for performing the method of claim 1.

* * * * *